United States Patent
Haskara et al.

(10) Patent No.: US 9,771,883 B1
(45) Date of Patent: Sep. 26, 2017

(54) SUPERVISORY MODEL PREDICTIVE CONTROL IN AN ENGINE ASSEMBLY

(71) Applicant: GM GLOBAL TECHNOLOGY OPERATIONS LLC, Detroit, MI (US)

(72) Inventors: Ibrahim Haskara, Macomb, MI (US); Yiran Hu, Shelby Township, MI (US); Chen-Fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 15/077,249

(22) Filed: Mar. 22, 2016

(51) Int. Cl.
| | |
|---|---|
| *F02D 37/02* | (2006.01) |
| *B60R 16/023* | (2006.01) |
| *F02D 13/02* | (2006.01) |
| *F02D 41/26* | (2006.01) |
| *F02B 37/18* | (2006.01) |
| *F01L 1/34* | (2006.01) |
| *F02D 41/04* | (2006.01) |

(52) U.S. Cl.
CPC .......... *F02D 37/02* (2013.01); *B60R 16/0236* (2013.01); *F01L 1/34* (2013.01); *F02B 37/18* (2013.01); *F02D 13/0219* (2013.01); *F02D 41/04* (2013.01); *F02D 41/26* (2013.01)

(58) Field of Classification Search
CPC .......... F02D 37/02; F02D 41/04; F02D 41/26; F02D 13/0219; F01L 1/34; F02B 37/18
See application file for complete search history.

(56) References Cited

U.S. PATENT DOCUMENTS

| | | | | |
|---|---|---|---|---|
| 8,055,417 B2* | 11/2011 | Bai | ...................... | B60W 10/06 701/58 |
| 9,466,038 B2* | 10/2016 | Kezeu | .................. | G06Q 10/063 |
| 2014/0316683 A1* | 10/2014 | Whitney | ............... | F02D 11/105 701/108 |

* cited by examiner

Primary Examiner — Hieu T Vo
(74) Attorney, Agent, or Firm — Quinn IP Law

(57) ABSTRACT

An engine assembly includes a control module configured to receive a torque request and an engine configured to produce an output torque in response to the torque request. The control module includes a processor and tangible, non-transitory memory on which is recorded instructions for executing a method for supervisory model predictive control. The control module includes a multi-layered structure with an upper-level ("UL") optimizer module configured to optimize at least one system-level objective and a lower-level ("LL") tracking control module configured to maintain at least one tracking parameter. The multi-layered structure is characterized by a decoupled cost function such that the UL optimizer module minimizes an upper-level cost function ($CF_{UL}$) and the LL tracking control module minimizes a lower-level cost function ($CF_{LL}$). The system-level objective may include minimizing fuel consumption of the engine and the tracking parameter may include delivering the torque requested to engine.

17 Claims, 2 Drawing Sheets

SUPERVISORY MODEL PREDICTIVE CONTROL IN AN ENGINE ASSEMBLY

TECHNICAL FIELD

The disclosure relates generally to an engine assembly, and more specifically, to supervisory model predictive control in an engine assembly.

BACKGROUND

Many modern engines are equipped with multiple actuators to achieve multiple goals, such as better fuel economy and other goals. However, it becomes more challenging to optimize multiple objectives due to the increasing complexity of the engine system.

SUMMARY

An engine assembly includes a control module configured to receive a torque request and an engine configured to produce an output torque in response to the torque request. The control module includes a processor and tangible, non-transitory memory on which is recorded instructions for executing a method for supervisory model predictive control. The control module includes a multi-layered structure with an upper-level (referred to herein as "UL") optimizer module configured to optimize at least one system-level objective. The control module includes a lower-level (referred to herein as "LL") tracking control module configured to maintain at least one tracking parameter. The multi-layered structure is characterized by a decoupled cost function such that the UL optimizer module minimizes an upper-level cost function ($CF_{UL}$) and the LL tracking control module minimizes a lower-level cost function ($CF_{LL}$).

The system-level objective may include minimizing fuel consumption of the engine and the tracking parameter may include delivering the torque requested to engine. The system-level objective may include minimizing lambda emissions and improving drivability of the engine. The control module may be programmed to run the UL optimizer module at a first time rate and the LL tracking control module at a second time rate. The second time rate may be different from the first time rate.

The control module may be programmed to obtain a nominal set-point value for a tracking control variable related to the at least one system-level objective. An optimal set-point differential is obtained for the at least one system-level objective via the upper-level cost function ($CF_{UL}$). A final set-point value is obtained by adding the nominal set-point value and the optimal set-point differential for the at least one system-level objective.

The control module may be programmed to maintain the at least one tracking parameter and the final set-point value of the at least one system-level objective by minimizing the lower-level cost function ($CF_{LL}$). The control module may obtain sensor data via at least one sensor operatively connected to the engine. The control module may be programmed to issue a plurality of actuator commands based on an engine model, the lower-level cost function ($CF_{LL}$) and the sensor data. The UL optimizer module employs a reference model incorporating the LL tracking control module and an engine model. The LL tracking control module employs the engine model only. The engine model may be data-driven or physics based.

The above features and advantages and other features and advantages of the present disclosure are readily apparent from the following detailed description of the best modes for carrying out the disclosure when taken in connection with the accompanying drawings.

DETAILED DESCRIPTION

Figure 1:
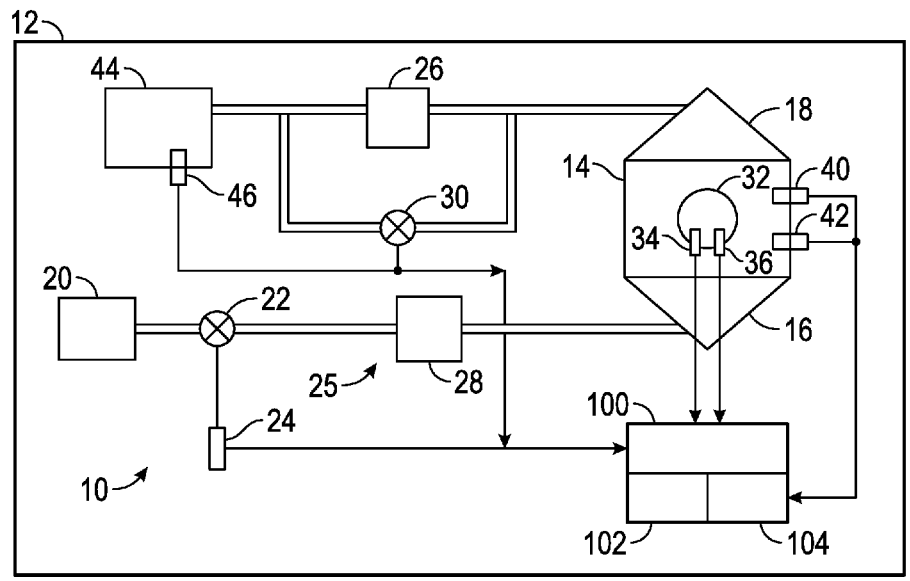
FIG. 1 is a schematic fragmentary view of an engine assembly having an engine and a control module.

Referring to the drawings, wherein like reference numbers refer to like components, FIG. 1 schematically illustrates an engine assembly 10. The engine assembly 10 may be part of a device 12. The device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 12 may take many different forms and include multiple and/or alternate components and facilities.

Referring to FIG. 1, the assembly 10 includes an engine 14. In the embodiment shown, the engine 14 is an internal combustion engine capable of combusting an air-fuel mixture in order to generate an output torque. However, the engine 14 may be any type of engine known to those skilled in the art. Referring to FIG. 1, the engine assembly 10 includes a control module 100 operatively connected to or in electronic communication with the engine 14 and other components of the assembly 10. The control module 100 is configured to receive a torque request ($T_R$) for delivery by the engine 14.

Referring to FIG. 1, the assembly 10 includes an intake manifold 16 and an exhaust manifold 18, each in fluid communication with the engine 14. The intake manifold 16 is configured to receive airflow from an air source 20, such as the atmosphere. The assembly 10 includes a throttle valve 22 that is adjustable to control the airflow into the intake manifold 16, based at least partially on a signal from the control module 100. A throttle position sensor 24 may be used to detect the position/opening of the throttle valve 22.

The assembly 10 may include a mechanical supercharging device 25 configured to compress the airflow before the airflow enters the intake manifold 16 of the engine 14. Compression of the airflow forces more air (and more oxygen) into the engine 14 than would otherwise be achievable with ambient atmospheric pressure. The mechanical supercharging device 25 may include a turbine 26 and a compressor 28. The assembly 10 may include a turbocharging actuator 30. The turbocharging actuator 30 may include a wastegate valve configured to divert exhaust gases away from the turbine 26, based at least partially on a signal from the control module 100. The wastegate valve is configured to regulate the boost pressure in the mechanical supercharging device 25. The turbocharging actuator 30 may include a variable geometry turbocharger to control the amount of exhaust flow from the turbine, and in turn the amount of boost pressure level (compressed air flow).

Referring to FIG. 1, the engine 14 includes a cylinder 32 having a fuel injector 34. Although a single cylinder is shown, it is to be understood that the engine 14 may include multiple cylinders with corresponding fuel injectors. The control module 100 adjusts the flow of fuel through the fuel injector 34 based on the airflow into the cylinder 32, to control the air-fuel-ratio (AFR) within the cylinder 32. The control module 100 is configured to control the ignition timing to ignite the compressed air-fuel mixture through an ignition start control signal. The engine 14 may be a gasoline spark ignited engine having a spark-plug 36 configured to generate an electric spark in order to ignite the compressed air-fuel mixture in the cylinder 32, based at least partially on the ignition start control signal. Alternatively, for compression ignition engines, fuel injection timing, like the start of fuel injection, may be used as an input to control combustion start.

Referring to FIG. 1, the assembly 10 includes an intake cam phaser 40 and an exhaust cam phaser 42. The intake cam phaser 40 is configured to control the airflow between the intake manifold 16 and the cylinder 32 by controlling the movement of an intake valve (not shown). The exhaust cam phaser 42 is configured to control the flow of exhaust gases between the cylinder 32 and the exhaust manifold 18 by controlling the movement of an exhaust valve (not shown). The intake cam phaser 40 and the exhaust cam phaser 42 are operable based at least partially on an intake cam and an exhaust cam signal, respectively, from the control module 100.

Referring to FIG. 1, the exhaust manifold 18 is in fluid communication with the engine 14, and capable of receiving exhaust gases from the engine 14. The combustion of the air-fuel mixture in the cylinder 32 produces exhaust gases. The exhaust gases may be directed to an exhaust gas after-treatment system 44. The exhaust gases may be partially recirculated back to the cylinders (such as cylinder 32) through an external EGR (exhaust gas recirculation) mechanism to control the EGR level in the cylinders.

Referring to FIG. 1, the assembly 10 may include an emissions sensor 46 configured to measure or estimate various emissions of the engine 14. The emissions sensor 46 may be configured to measure or estimate individual emission constituents including, but not limited to, nitric oxides (NOx), hydrocarbons (HC), particulate matters (PM). The emissions sensor 46 may include a lambda sensor configured to measure a lambda sensor reading ($\lambda$) in the exhaust gas. The lambda signal is the ratio of the amount of oxygen actually present in the exhaust gas compared to the amount that should have been present in order to obtain complete combustion.

Figure 3:
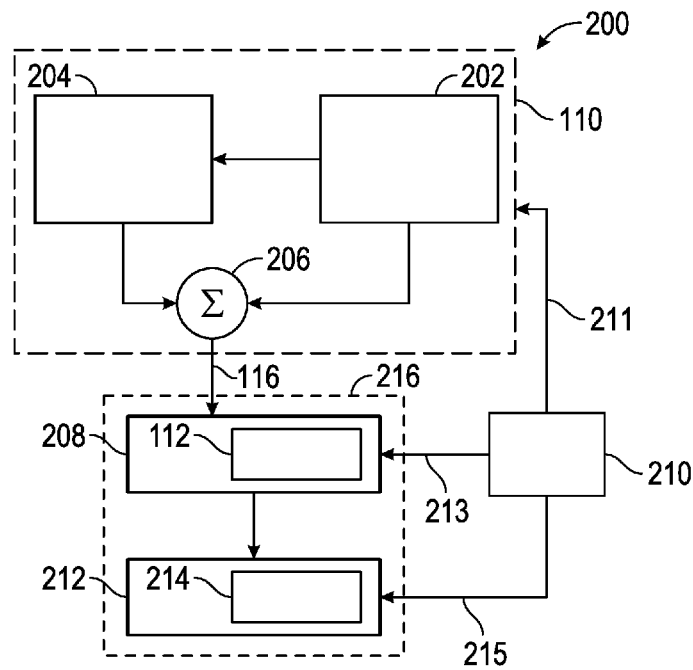
FIG. 3 is a flowchart for a method for supervisory model predictive control executable by the control module of FIG. 1.

Referring to FIG. 1, the control module 100 includes at least one processor 102 and at least one memory 104 (or any non-transitory, tangible computer readable storage medium) on which are recorded instructions for executing method 200, shown in FIG. 3, for supervisory model predictive control. The control module 100 of FIG. 1 is specifically programmed to execute the steps of the method 200 of FIG. 3. The memory 104 can store control module-executable instruction sets, and the processor 102 can execute the control module-executable instruction sets stored in the memory 104.

In a complex engine system, there are multiple objectives at multiple levels, such as for example, minimization of fuel usage as well as delivering the requested torque. A single-level optimization system may not distinguish "fuel minimization at the expense of reducing torque" from "minimizing fuel while delivering the requested torque." The method 200 enables the control module 100 to self-optimize at least one system-level objective (e.g., fuel economy, emissions, drivability) based on supervisory model predictive control of the closed-loop tracking control via set-point/reference optimization. The control module 100 described herein allows for optimization of multiple objectives at multiple levels through a multi-layered or hierarchical structure.

Figure 2:
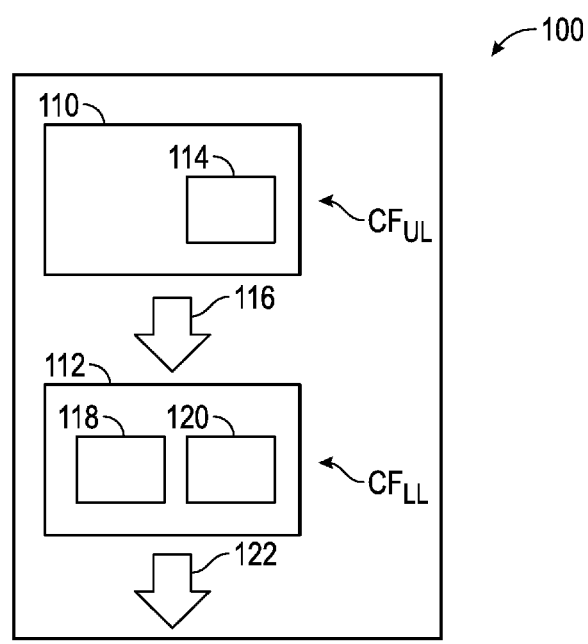
FIG. 2 is diagram illustrating the multi-layered or hierarchical structure of the control module of FIG. 1, which includes first and second MPC modules.

Referring to FIG. 2, a diagram illustrating the multi-layered or hierarchical structure of the control module 100 is shown. The control module 100 includes a multi-layered structure with an upper-level (referred to herein as "UL") optimizer module 110 configured to optimize at least one system-level objective. The control module 100 includes a lower-level (referred to herein as "LL") tracking control module 112 configured to maintain at least one tracking objective. For example, the system-level objective may include minimizing fuel consumption of the engine 14 and the tracking objective may include delivering the torque requested to the engine 14. The tracking objective may include maintaining (tracking a reference/command value) the boost or manifold pressure, cylinder air change or EGR levels. The system-level objective may include improving drivability of the engine 14. The system-level objective may include minimizing various emissions of the engine 14, as measured by the emissions sensor 46.

The control module 100 may be programmed to run the UL optimizer module 110 at a first time rate and the LL tracking control module 112 at a second time rate. The first time rate and the second time rate may be the same. The second time rate may be different from the first time rate. For example, the LL tracking control module 112 may be run continuously during operation of the engine assembly 10 and the UL optimizer module 110 may be run at predefined intervals. The LL tracking control module 112 may employ any type of control methodology. The UL optimizer module 110 may work with any type of tracking controller in the LL tracking control module 112.

Referring to FIG. 2, the multi-layered structure of the control module 100 is characterized by a decoupled cost function such that the UL optimizer module 110 minimizes an upper-level cost function ($CF_{UL}$) and the LL tracking control module 112 minimizes a lower-level cost function ($CF_{LL}$). The UL optimizer module 110 employs a first model predictive control (MPC) module 114. The first MPC module 114 decides an optimal control action to minimize the upper-level cost function ($CF_{UL}$) over a prediction horizon. The upper-level cost function ($CF_{UL}$) includes the system-level objectives, for example, related to fuel economy, emissions and drivability.

Referring to FIG. 2, the LL tracking control module 112 employs a second model predictive control (MPC) module 118. The second MPC module 118 decides an optimal control action to minimize the lower-level cost function ($CF_{LL}$) over the prediction horizon. The lower-level cost function ($CF_{LL}$) may include closed-loop control performance metrics like tracking error and control effort. The tracking error is defined as between a measurement and target. The LL tracking control module 112 determines an actuator command signal 122 for torque and lambda tracking to given respective reference values (desired torque and lambda). The LL tracking control module 112 may employ an estimation filter, such as for example, a Kalman filter 120. The Kalman filter 120 is a recursive algorithm, producing estimates of the current state variables, along with their uncertainties. Once the outcome of the next measurement (including random noise) is observed, these estimates are updated using a weighted average, with more weight being given to estimates with higher certainty. It is to be appreciated that the LL tracking control module 112 may be in the form of multiple PIDs or any other advanced methods.

Referring now to FIG. 3, a flowchart of the method 200 stored on and executable by the control module 100 of FIG. 1 is shown. Method 200 need not be applied in the specific order recited herein. Furthermore, it is to be understood that some steps may be eliminated. The method 200 optimizes at least one system-level objective (e.g. fuel economy) without compromising set-point tracking (i.e. torque delivery) needs.

Referring to FIG. 3, method 200 may begin with block 202, where the control module 100 is programmed or configured to obtain a nominal set-point value for the at least one system-level objective. The nominal set-point values may be static functions of engine speed (N) and the torque request. The nominal set-point values may include a desired emission level (e.g. desired lambda), desired torque, desired cylinder-air-charge, or desired boost or manifold pressures or EGR levels, desired fuel injection and spark timings and a desired brake specific fuel consumption (rate of fuel consumption divided by the power produced). The nominal set-point values are set-points to be maintained at desired levels (by the LL tracking control module 112) for variables like cylinder-air-charge, boost pressure or EGR levels where their desired nominal values (which is the output of block 202) can be generated by models and/or tables executed in block 202 for given desired torque and engine speed. The nominal set-point values may be generated by inverse models In block 204 of FIG. 3, the control module 100 is programmed to obtain an optimal set-point differential (see FIG. 2) for each of the system-level objectives via the upper-level cost function ($CF_{UL}$). Output 116 is the output of summation, which is the sum of "optimal set-point differential" (output of block 214) and the nominal set-point value (from block 202). The optimal set-point differential may include a cylinder air charge correction ($\delta CAC$), a spark timing correction (GSA), an intake cam phasing correction ($\delta ICam^{SP}$), and an exhaust cam phasing correction ($\delta ECam^{SP}$). Block 204 can be disabled intermittently so that set points come from only from block 202 (i.e. nominal feed-forward values).

In block 206 of FIG. 3, the control module 100 is programmed to obtain a final set-point value by adding the nominal set-point value and the optimal set-point differential for each of the system-level objectives. Referring to FIGS. 1 2 and 3, line 116 shows the final or final set-point value (differential+nominal) for each set-point variable. Stated differently, block 202 generates the nominal for a given set-point and block 204 generates the differential for the same. The output of summation in block 206 is the final set-point value, indicated by line 116. Referring to FIG. 2, the tracking control module 112 generates the actuator commands 122 so as to track or maintain the final set-point values at those desired values.

In block 208 of FIG. 3, the control module 100 is programmed to maintain the at least one tracking parameter and the final set-point value of the at least one system-level objective by minimizing the lower-level cost function ($CF_{LL}$). The tracking parameters may include cylinder air charge, air flow, EGR flow, boost pressure and manifold pressures. The air charge or boost variables are internal to the closed-loop control of the LL tracking control module 112 and accessed by the UL optimizer module 110 only intermittently for optimization. The UL optimizer module 110 may determine a delta "air charge" set-point or delta "boost pressure" set-point in block 204. This provides an extra boost during acceleration for the device 12.

In block 210 of FIG. 3, the control module 100 is programmed to obtain sensor data via at least one sensor operatively connected to the engine 14. The at least one sensor may include the emissions sensor 46, the throttle position sensor 24 and respective sensors operatively connected to the intake cam phaser 40 and exhaust cam phaser 42. The sensor data may be from physical or virtual sensors. Both the UL optimizer module 110 and the LL tracking control module 112 use the sensor data of block 210, see feedback signals 211, 213 and 215.

In block 212 of FIG. 3, the control module 100 is programmed to issue a plurality of actuator commands 122 based on an engine model 214, the lower-level cost function ($CF_{LL}$) and the sensor data. The actuator commands 122 may include a throttle position signal to the throttle valve 22 and a turbocharging actuator signal to the turbocharging actuator 30 (such as wastegate valve and variable geometry turbine). The actuator commands 122 may include respective intake and exhaust cam phaser signals to the intake cam phaser 40 and the exhaust cam phaser 42. The actuator commands 122 may include EGR and ignition start control signals, such as spark timing signal to the spark plug 36, and fuel injection timing signal to the fuel injector 34.

For the LL tracking control module 112, the actuator command signal 122 is determined based on an engine model 214. The engine model 214 may be physics-based or data-driven model of the engine 14 in a linear or non-linear parameter varying (LPV) or a linear or non-linear time varying (LTV) model of the engine. Any engine model known to those skilled in the art may be employed. For the UL optimizer module 110, the set-point corrections are calculated based on the model of both the LL tracking control module 112 and the engine model 214, which is referred to collectively here and shown in FIG. 3, as a reference model of block 216.

The lower-level cost function ($CF_{LL}$) may be defined as:

$$CF_{LL} = \Sigma_{k=1}^{N_{LL}}(Y_k - Y_k^{sp})' W_{YLL}(Y_k - Y_k^{sp}) + (\delta U_k)' W_{ULL}(\delta U_k).$$

Here k is a time variable, Y is a vector of variables to be tracked, i.e., a matrix including the tracking parameter. $Y^{sp}$ the corresponding set-point profiles, i.e., a matrix including respective final set-point value of the at least one tracking parameter. $W_{YLL}$ and $W_{ULL}$ are respective dynamic weighting factors and U is a matrix of actuator commands. Here, matrix is considered interchangeable with vectors. For torque and lambda tracking objectives, Y includes TQ (torque) and λ. For boost pressure or air charge tracking, Y also includes boost/manifold pressures, cylinder-air charge, air/EGR flow etc.

The upper-level cost function ($CF_{UL}$) may be defined as:

$$CF_{UL} = \sum_{k=1}^{N_{UL}} (P_k - P_{ref,k})' W_{PUL}(P_k - P_{ref,k}) + (\delta Y_k^{sp})' W_{SP}(\delta Y_k^{sp})$$

Here k is a time variable, P is a matrix/vector including the variables for the system-level performance metrics like fuel economy, emissions, and drivability, i.e., a matrix including a tracking control variable related to the at least one system-level objective. $P_{ref}$ is a matrix including corresponding reference values for P. P may be a vector in the form of P=[F E D]', where F is for fuel economy, such as CFC (cylinder fuel charge); E is for emission (λ or any individual emission variable); D is for drivability, like torque (TQ), or in-cylinder residual as a limit. $W_{PUL}$ and $W_{SP}$ are respective dynamic weighting factors. Additionally $\delta Y^{sp}$ is a matrix including differentials for the set-point. $Y^{sp}=\delta Y^{sp}+Y_n^{sp}$ is the final set-point and $Y_n^{sp}=f(N, TQ^{sp}, ...)$ is the nominal set-point values generated from inverse models and/or tables in terms of desired speed and torque and other sensor information.

In one embodiment, highlighting only a fuel economy component using CFC and its reference $CFC_{ref}$ in the cost function, the upper-level cost function ($CF_{UL}$) may be defined as:

$$CF_{UL} = \sum_{k=1}^{n}\left(\frac{n_{cyl}(CFC_k - CFC_{r,k})}{4\pi TQ_k}\right)^2 \quad (2)$$

$CFC_k$ denotes cylinder-fuel-charge at time k. $CFC_{r,k}$ is a reference fuel charge, which could also be cylinder-air-charge with a gain or without. $n_{cyl}$ is the number of cylinders in the engine 14 and $TQ_k$ is the measured torque at time k.

A reference fuel term may be added in equation (2) above as a bias in the fuel economy metric. Because there is a minimum fuel needed to deliver the desired torque, fuel minimization is re-casted as "reference fuel tracking", i.e., tracking a fuel reference less than the unknown best fuel leading to fuel minimization. The desired-torque dependent reference fuel may be determined in different ways. The reference fuel may be based on the set-point cylinder-air-charge ($CAC^{sp}$). The desired cylinder-air-charge (CAC) is a multiple of desired cylinder-fuel-charge and vice versa for a given desired air-to-fuel ratio. An inverse torque-to-CAC model may be used to generate the set-point cylinder-air-charge ($CAC^{sp}$). In one embodiment, the reference fuel is based on fuel-conversion efficiency such that:

$$CFC_r = K \cdot \frac{4\pi}{n_{cyl}n_{CFC}(N, CAC)c_{HV}} TQ^{sp}$$

Here $c_{HV}$ is the fuel heating value and $\eta_{CFC}$ is the fuel conversion efficiency. $TQ^{sp}$ is the desired torque. A multiplier (K) is used to make the reference fuel less than the desired torque-dependent minimum ideal fuel. The multiplier is also used to disable the fuel economy cost term during conditions like deceleration fuel cut-off. In another embodiment, an inverse torque-to-air model may be used to generate a cylinder air charge set-point to deliver the desired torque. This air-charge set-point and desired air-to-fuel ratio gives the base reference fuel.

The method 200 may include indirect fuel economy metrics such as pumping mean effective pressure ("PMEP") and volumetric efficiency ("VE") capturing loss terms causing fuel economy degradation. For example, the fuel cost term may be replaced with the following terms involving one or both of the PMEP and VE:

$\Sigma_{k=1}^n |PMEP_k - PMEP_{r,k}|^2$ and $\Sigma_{k=1}^n |VE_k - VE_{r,k}|^2$ A reference (corresponding to the target torque level) for these variables may be added.

Figure 4:
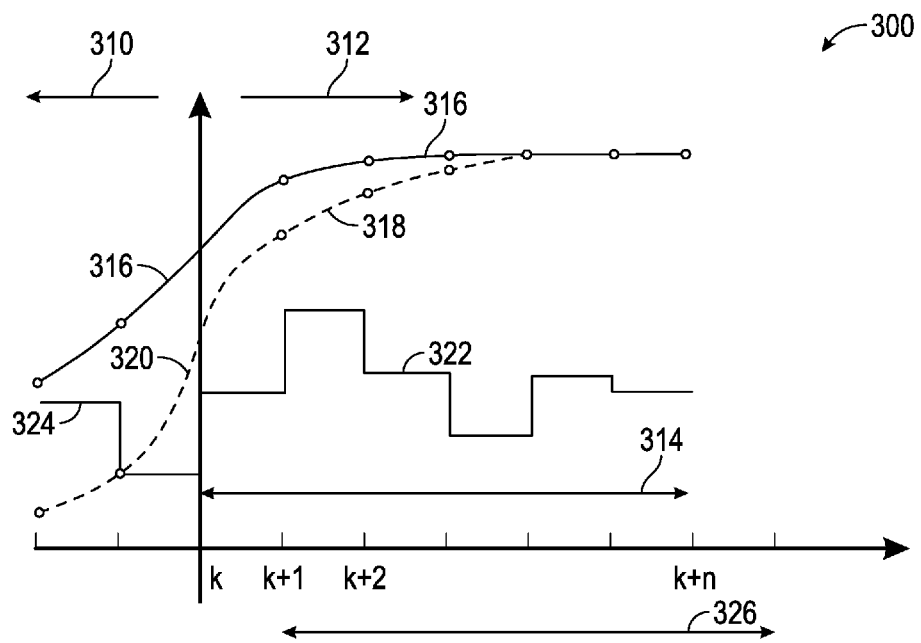
FIG. 4 is an example graph of model predictive control that may be employed by the first and second MPC modules of FIG. 2.

Referring to FIG. 2, the UL optimizer module 110 and the LL tracking control module 112 employ a model predictive control sequence, via the first and second MPC modules 114, 118 respectively. FIG. 4 illustrates an example MPC sequence 300. Portion 310 shows the past and portion 312 shows the future. The horizontal axis represents time-step k. The MPC sequence 300 is based on iterative, finite-horizon optimization of an engine model. As noted above, the LL tracking control module 112 (via second MPC module 118) may employ an engine model 214 (see FIG. 3) that is physics-based or data-driven. The UL optimizer module 110 (via first MPC module 114) may employ a reference model of block 216 (see FIG. 3), which includes both the LL tracking control module 112 and the engine model 214.

FIG. 4 illustrates a reference trajectory 316, predicted output 318, measured output 320, past control input 324 and predicted control input 322. At time-step k, the current engine state is sampled and a minimum value of the respective cost function is computed for a time horizon in the future, referred to as prediction horizon 314. A future control sequence which minimizes the cost function may be obtained by a numerical minimization algorithm, such as quadratic programming. The current measurements, past control input 324 and the model are used to find a future control sequence to optimize (minimize) the cost function. The first element of the control sequence is applied at the current step, the engine state is sampled again and the calculations are repeated starting from the new current state, yielding a new predicted path. The prediction horizon 314 is shifted forward in time, resulting in a receding prediction horizon 326.

In summary, the overall control system has two components or functionality. First is the tracking controller, referred to herein as the LL tracking control module 112, which generates actuator commands 122 for multiple actuators in the engine 14 such that desired values for different set-point variables (such as torque, lambda, air-charge, boost or manifold pressures) are tracked or maintained (i.e. each follow respective desired profiles). Second is the real-time set-point optimizer, referred to herein as the UL optimizer module 110, which generates the desired values/profiles for the set-points (i.e., desired air-charge, desired boost or manifold pressures etc. for the LL tracking control module 112 to use). Desired values for each set-point include a nominal value/profile generated by either look-up tables or inverse physical models or a combination of both as executed in block 202.

The UL optimizer module 110 creates a differential in real-time (block 204) to add to the nominal reference to generate the final set-point values for each. The final real-time optimized desired set-points (output of block 206) are used by the LL tracking control module 112 to track. The UL optimizer module 110 uses predictive control to generate optimized set points for the LL tracking control module 112 using a cost function comprising system-level objectives, such as minimize fuel economy and emissions, improved drivability. The LL tracking control module 112 generates the final actuator commands 122 such that those set-points (optimized in real-time as in the output of 206) are achieved. For example, for each set-point variable (i.e. boost pressure), the LL tracking control module 112 generates the actuator control commands (i.e. waste-gate position) such that boost pressure (measured or estimated value from block 210) is tracking its corresponding desired value (i.e. output of 206 for the boost pressure variable). In one embodiment, the LL tracking control module 112 achieves this using predictive control where there is a cost function to minimize comprising tracking error and control effort. In another embodiment, the LL tracking control module 112 is in the form of multiple PIDs or any other advanced methods.

The actuator commands 122 may include throttle valve, fuel amount, waste-gate or VGT, EGR valves, intake/exhaust valve timings (ICAM, ECAM), spark and fuel injection timing, engine mode (cylinder deactivation). The set-point variables may include torque, lambda, cylinder air charge, air or EGR flow, boost/manifold pressures, base spark, fuel injection and valve timings (ICAM, ECAM).

The control module 100 (and execution of the method 200) improves the functioning of the device 12 by optimizing multiple variables at multiple levels of a complex engine system, with minimal calibration required. The control module 100 of FIG. 1 may be an integral portion of, or a separate module operatively connected to, other control modules of the device 12.

The control module 100, as well as the LL tracking control module 112 and the UL optimizer module 110 include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An engine assembly comprising:
a control module configured to receive a torque request;
an engine operatively connected to the control module configured to produce an output torque in response to the torque request;
wherein the control module includes a processor and tangible, non-transitory memory on which is recorded instructions for executing a method for supervisory model predictive control;
wherein the control module includes a multi-layered structure with an upper-level ("UL") optimizer module configured to optimize at least one system-level objective and a lower-level ("LL") tracking control module configured to maintain at least one tracking parameter; and
wherein the multi-layered structure is characterized by a decoupled cost function such that the UL optimizer module minimizes an upper-level cost function ($CF_{UL}$) and the LL tracking control module minimizes a lower-level cost function ($CF_{LL}$).

2. The engine assembly of claim 1, wherein the at least one system-level objective includes minimizing fuel consumption of the engine and the at least one tracking parameter includes delivering the torque request.

3. The engine assembly of claim 1, further comprising:
an emissions sensor operatively connected to and configured to measure emissions of the engine; and
wherein the at least one system-level objective includes minimizing the emissions of the engine, as measured by the emissions sensor.

4. The engine assembly of claim 1, wherein the control module is programmed to run the UL optimizer module at a first time rate and the LL tracking control module at a second time rate, the second time rate being different from the first time rate.

5. The engine assembly of claim 1:
wherein the lower-level cost function ($CF_{LL}$) is defined as $$CF_{LL} = \Sigma_{k=1}^{NLL}(Y_k - Y_k^{sp})'W_{YLL}(Y_k - Y_k^{sp}) + (\delta U_k)'W_{ULL}(\delta U_k); \text{ and}$$

wherein k is a time variable, Y is a matrix including the at least one tracking parameter, $Y^{sp}$ is a matrix including respective final set-point value of the at least one tracking parameter, $W_{YLL}$ and $W_{ULL}$ are respective dynamic weighting factors and U is a vector of actuator commands.

6. The engine assembly of claim 1:
wherein the upper-level cost function ($CF_{UL}$) is defined as $$CF_{UL} = \Sigma_{k=1}^{NUL}(P_k - P_{ref,k})'W_{PUL}(P_k - P_{ref,k}) + (\delta Y_k^{sp})'W_{SP}(\delta Y_k^{sp}); \text{ and}$$

wherein k is a time variable, P is a matrix including a tracking control variable related to the at least one system-level objective, $P_{ref}$ is a matrix including corresponding reference values for P, $W_{PUL}$, and $W_{SP}$ are respective dynamic weighting factors and $\delta Y^{sp}$ is a matrix including an optimal set-point differential.

7. The engine assembly of claim 1, wherein execution of the instructions by the processor causes the control module to:

obtain a nominal set-point value for a tracking control variable related to the at least one system-level objective;

obtain an optimal set-point differential for the at least one system-level objective via the upper-level cost function ($CF_{UL}$);

obtain a final set-point value by adding the nominal set-point value and the optimal set-point differential.

8. The engine assembly of claim 7, further comprising:
at least one sensor operatively connected to the engine;
wherein the control module is programmed to:
   maintain the at least one tracking parameter and the final set-point value of the at least one system-level objective by minimizing the lower-level cost function ($CF_{LL}$);
   obtain sensor data via the at least one sensor; and
   issue a plurality of actuator commands based on an engine model, the lower-level cost function ($CF_{LL}$) and the sensor data.

9. The engine assembly of claim 8, wherein:
the UL optimizer module employs a reference model incorporating the LL tracking control module and an engine model; and
the LL tracking control module employs the engine model only.

10. The engine assembly of claim 8, wherein the engine includes at least one cylinder and further comprising:
an intake manifold and an exhaust manifold, each fluidly connected to the at least one cylinder;
wherein the engine is configured to receive an airflow through the intake manifold and the engine is configured to produce an exhaust gas for delivery to the exhaust manifold;
a mechanical supercharging device configured to compress the airflow before the airflow enters the intake manifold of the engine;
a wastegate valve configured to divert the exhaust gas away from the mechanical supercharging device based at least partially on an ignition start control signal signal from the control module; and
wherein the plurality of actuator commands includes the ignition start control signal.

11. The engine assembly of claim 8, wherein the engine includes at least one cylinder and further comprising:
an intake manifold and an exhaust manifold, each fluidly connected to the at least one cylinder;
an intake cam phaser configured to control an airflow between the intake manifold and the at least one cylinder, based at least partially on an intake cam phaser signal from the control module;
an exhaust cam phaser configured to control an exhaust gas between the exhaust manifold and the at least one cylinder based at least partially on an exhaust cam phaser signal from the control module; and
wherein the plurality of actuator commands includes the intake and exhaust cam phaser signals.

12. The engine assembly of claim 8, wherein the engine includes at least one cylinder and further comprising:
a spark plug configured to generate an electric spark in the cylinder based at least partially on an ignition start control signal from the control module;
wherein the plurality of actuator commands includes the ignition start control signal.

13. A method of supervisory control in an engine assembly having a control module configured to receive a torque request and an engine configured to produce an output torque in response to the torque request, the method comprising:
obtaining a nominal set-point value for at least one system-level objective, the control module including a multi-layered structure with an UL optimizer module configured to optimize the at least one system-level objective and a LL tracking control module configured to maintain at least one tracking parameter;
obtaining an optimal set-point differential for the at least one tracking parameter related to the at least one system-level objective via an upper-level cost function ($CF_{UL}$);
obtaining a final set-point value by adding the nominal set-point value and the optimal set-point differential; and
controlling the engine assembly based upon the final set-point value.

14. The method of claim 13, further comprising:
maintaining the at least one tracking parameter and the final set-point value of the at least one system-level objective by minimizing the lower-level cost function ($CF_{LL}$);
obtaining sensor data via the at least one sensor; and
issuing a plurality of actuator commands based on an engine model, the lower-level cost function ($CF_{LL}$) and the sensor data.

15. The method of claim 14, wherein the multi-layered structure is characterized by a decoupled cost function such that the UL optimizer module minimizes the upper-level cost function ($CF_{UL}$) and the LL tracking control module minimizes the lower-level cost function ($CF_{LL}$).

16. An engine assembly comprising:
a control module configured to receive a torque request;
an engine operatively connected to the control module configured to produce an output torque in response to the torque request;
wherein the control module includes a processor and tangible, non-transitory memory on which is recorded instructions for executing a method for supervisory model predictive control;
wherein the control module includes a multi-layered structure with an UL optimizer module configured to optimize at least one system-level objective and a LL tracking control module configured to maintain at least one tracking parameter;
wherein the multi-layered structure is characterized by a decoupled cost function such that the UL optimizer module minimizes an upper-level cost function ($CF_{UL}$) and the LL tracking control module minimizes a lower-level cost function ($CF_{LL}$);
wherein the lower-level cost function ($CF_{LL}$) is defined as $$CF_{LL} = \Sigma_{k=1}^{N_{LL}}(Y_k - Y_k^{sp})'W_{Y_{LL}}(Y_k - Y_k^{sp}) + (\delta U_k)'W_{U_{LL}}(\delta U_k); \text{ and}$$

wherein k is a time variable, Y is a matrix including the at least one tracking parameter, $Y^{sp}$ is a matrix including respective final set-point value of the at least one tracking parameter, $W_{Y_{LL}}$ and $W_{U_{LL}}$ are respective dynamic weighting factors and U is a vector of actuator commands.

17. The engine assembly of claim 16, further comprising:
at least one sensor operatively connected to the engine;
wherein the control module is programmed to:
   obtain a nominal set-point value for the at least one system-level objective;

obtain an optimal set-point differential for the at least one system-level objective via the upper-level cost function ($CF_{UL}$);

obtain a final set-point value by adding the nominal set-point value and the optimal set-point differential for the at least one system-level objective;

maintain the at least one tracking parameter and the final set-point value of the at least one system-level objective by minimizing the lower-level cost function ($CF_{LL}$);

obtain sensor data via the at least one sensor; and issue a plurality of actuator commands based on an engine model, the lower-level cost function ($CF_{LL}$) and the sensor data.

* * * * *